US010627863B2

(12) United States Patent
Shaw et al.

(10) Patent No.: US 10,627,863 B2
(45) Date of Patent: Apr. 21, 2020

(54) SYSTEMS AND METHODS FOR AUTO-ALIGNING PROTRUDING CONNECTORS IN DOCKING INTERFACES

(71) Applicant: Dell Products, L.P., Round Rock, TX (US)

(72) Inventors: Timothy C. Shaw, Austin, TX (US); Bradford Edward Vier, Austin, TX (US); Timothy M. Radloff, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/385,801

(22) Filed: Apr. 16, 2019

(65) Prior Publication Data

US 2019/0243420 A1    Aug. 8, 2019

Related U.S. Application Data

(62) Division of application No. 15/645,166, filed on Jul. 10, 2017, now Pat. No. 10,303,213.

(51) Int. Cl.
| | |
|---|---|
| *G06F 1/16* | (2006.01) |
| *H01R 13/62* | (2006.01) |
| *H01R 13/631* | (2006.01) |
| *H01F 7/02* | (2006.01) |
| *H01F 7/20* | (2006.01) |
| *H01F 7/06* | (2006.01) |

(52) U.S. Cl.
CPC ......... *G06F 1/1632* (2013.01); *H01F 7/0205* (2013.01); *H01F 7/0263* (2013.01); *H01F 7/064* (2013.01); *H01F 7/20* (2013.01); *H01R 13/6205* (2013.01); *H01R 13/6315* (2013.01); *H01R 2201/06* (2013.01)

(58) Field of Classification Search
CPC ...... H01F 7/0205; H01F 7/0263; H01F 7/064; H01F 7/20; G06F 1/1632; G06F 1/1669; H01R 13/6205; H01R 13/6315
See application file for complete search history.

(56) References Cited

U.S. PATENT DOCUMENTS

| 9,645,608 | B1 * | 5/2017 | Tsai | G06F 1/1616 |
|---|---|---|---|---|
| 2010/0238620 | A1 * | 9/2010 | Fish | G06F 1/1616 |
| | | | | 361/679.09 |
| 2013/0170126 | A1 * | 7/2013 | Lee | G06F 1/1654 |
| | | | | 361/679.17 |

(Continued)

*Primary Examiner* — Hoa C Nguyen
*Assistant Examiner* — Keith DePew
(74) *Attorney, Agent, or Firm* — Fogarty LLP (57) ABSTRACT

Systems and methods for auto-aligning protruding connectors in docking interfaces are described. In some embodiments, a docking interface may include a male portion comprising: a first magnetic device, a second magnetic device disposed across from the first magnetic device, and a guidepost disposed between the first magnetic device and the second magnetic device, where the guidepost comprises a third magnetic device. The docking interface may also include a female portion comprising a fourth magnetic device and a fifth magnetic device disposed across from the fourth magnetic device leaving a gap between the fourth magnetic device and the fifth magnetic device, where the gap is configured to receive the guidepost.

18 Claims, 9 Drawing Sheets

(56) References Cited

U.S. PATENT DOCUMENTS

| | | | | |
|---|---|---|---|---|
| 2014/0177162 A1* | 6/2014 | Ho | ............... | G06F 1/1616 |
| | | | | 361/679.43 |
| 2014/0211445 A1* | 7/2014 | Hirai | ............... | G06F 1/1654 |
| | | | | 361/809 |
| 2015/0277491 A1* | 10/2015 | Browning | ............... | G06F 1/1632 |
| | | | | 361/679.44 |
| 2016/0204635 A1* | 7/2016 | Suzuki | ............... | H02J 7/0044 |
| | | | | 361/679.3 |
| 2016/0349801 A1* | 12/2016 | Liang | ............... | G06F 1/1662 |
| 2017/0168526 A1* | 6/2017 | Fujikawa | ............... | G06F 1/1615 |
| 2018/0046226 A1* | 2/2018 | Bowers | ............... | E05B 51/005 |
| 2018/0101193 A1* | 4/2018 | Tragatschnig | ............... | G06F 1/16 |
| 2018/0196470 A1* | 7/2018 | Shen | ............... | F16M 11/10 |
| 2018/0196479 A1* | 7/2018 | Li | ............... | G06F 1/1632 |

* cited by examiner

SYSTEMS AND METHODS FOR AUTO-ALIGNING PROTRUDING CONNECTORS IN DOCKING INTERFACES

CROSS-REFERENCE TO RELATED APPLICATIONS

This application is a divisional of, and claims the benefit of the filing date of, U.S. patent application Ser. No. 15/645,166, which is titled "SYSTEMS AND METHODS FOR AUTO-ALIGNING PROTRUDING CONNECTORS IN DOCKING INTERFACES" and was filed on Jul. 10, 2017, the disclosure of which is hereby incorporated by reference herein in its entirety.

FIELD

The present disclosure generally relates to information handling systems, and, more particularly, to systems and methods for auto-aligning protruding connectors in docking interfaces.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many cases, an information handling system may be designed to mate with other components via a docking interface to provide the IHS with additional capabilities. A conventional docking interface may include latched alignment features and pogo pins. However, transferring large amounts of data across IHS components often requires the use of protruding, high-pin count (HPC) connectors. And, as the inventors hereof have recognized, conventional techniques for aligning docking interfaces do not provide a seamless user experience when applied to protruding connectors.

SUMMARY

Embodiments of systems and methods for auto-aligning protruding connectors in docking interfaces are described. In an illustrative, non-limiting embodiment, a docking interface may include a male portion comprising: a first magnetic device, a second magnetic device disposed across from the first magnetic device, and a guidepost disposed between the first magnetic device and the second magnetic device, where the guidepost comprises a third magnetic device. The docking interface may also include a female portion comprising a fourth magnetic device and a fifth magnetic device disposed across from the fourth magnetic device leaving a gap between the fourth magnetic device and the fifth magnetic device, where the gap is configured to receive the guidepost.

In various implementations first, second, fourth, and fifth magnetic devices may have a given polarity orientation, and the third magnetic device may have another polarity orientation opposite the given polarity orientation. Additionally or alternatively, the first, second, fourth, and fifth magnetic devices may be clocked with respect to the third magnetic device. Moreover, the first, second, third, fourth, and fifth magnetic devices may have a circular shape, and a diameter of the first, second, fourth, and fifth magnetic devices may be greater than a diameter of the third magnetic device.

The clamping action between the first and fourth magnetic devices and between the second and fifth magnetic devices may increase in response to the third magnetic device approaching a center of the gap during a blind-mating operation between the male and female portions. Additionally or alternatively, the repulsion action between the third magnetic device and the fourth magnetic device and between the third magnetic device and the fifth magnetic device may increase in response to the third magnetic device moving away from a center of the gap during a blind-mating operation between the male and female portions.

In some cases, the docking interface may include another male portion comprising another first magnetic device, another second magnetic device disposed across from the other first magnetic device, and another guidepost disposed between the other first magnetic device and the other second magnetic device, such that the other guidepost comprises another third magnetic device. The docking interface may also include another female portion comprising another fourth magnetic device and another fifth magnetic device disposed across from the other fourth magnetic device with another gap between the other fourth magnetic devices and the firth magnetic device, where the other gap is configured to receive the other guidepost.

The docking interface may further include a data connector disposed between the guidepost and the other guidepost. The data connector may have a length shorter than another length of the guidepost. Moreover, the data connector may be supported by a floating connector system.

In some cases, one or more of the first, second, third, fourth, or fifth magnetic devices may include an electromagnetic coil. The magnetic field created by the electromagnetic coil may be manually configurable by an end-user of an information handling system (IHS) comprising the docking interface. Additionally or alternatively, the magnetic field may be dynamically configured by the IHS. Additionally or alternatively, the magnetic field created by the electromagnetic coil may be configured in response to an event generated by program instructions executed by the IHS. Additionally or alternatively, the magnetic field may be configured in response to a signal generated by a sensor coupled to the IHS.

The male portion may be part of a keyboard component of an IHS, and the female portion may be part of a display portion of the IHS. Additionally or alternatively, the male portion may be part of a dock and the female portion may be part of an IHS.

In another illustrative, non-limiting embodiment, a method may implement one or more of the aforementioned operations. In yet another illustrative, non-limiting embodiment, a hardware memory device may have program instructions stored thereon that, upon execution by an IHS, cause the IHS to perform one or more of the aforementioned operations.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein provide systems and methods for auto-aligning protruding connectors in docking interfaces between two or more information handling system (IHS) components or devices. In various implementations, these systems and methods provide a blind-mate, magnetic auto-alignment of docking interfaces that use high-pin count (HPC) connectors or the like (e.g., Universal Serial Bus Type C or "USB-C").

Placement of magnetic fields incorporates auto-alignment functionality using one or more guideposts included in the docking interface. Magnetic device(s) are embedded in and around the guidepost(s) to provide far-field alignment properties to the guideposts themselves. In some cases, circular magnets with diametrical magnetic fields are employed to provide both repulsion action (north/north or south/south) and/or attractive action (north/south or south/north) between IHS systems, dependent upon the relative positions of those systems.

Additionally or alternatively, an oval-shaped and/or poka-yoke magnet (with a flat surface, the shape of which may be matched by a pocket that receives the oval-shaped or poka-yoke magnet), may be used as an orientation feature to prevent polarization orientation mistakes during manufacturing of the docking interface and/or to allow magnets to spin around within a predetermined angular range or orbit during a docking operation. Moreover, a floating connector system may be used to accommodate manufacturing design tolerances.

Figure 1:
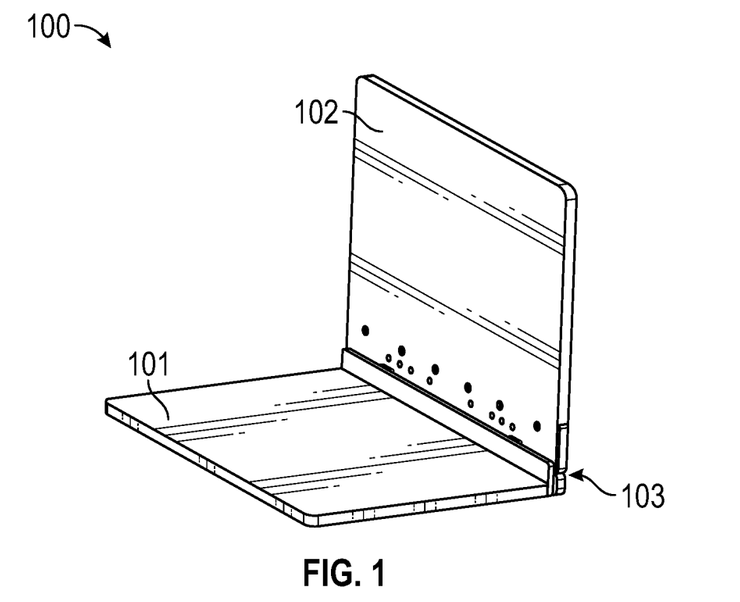
FIGS. 1 and 2 are diagrams of non-limiting examples of docked and undocked information handling systems according to some embodiments.
Figure 2:
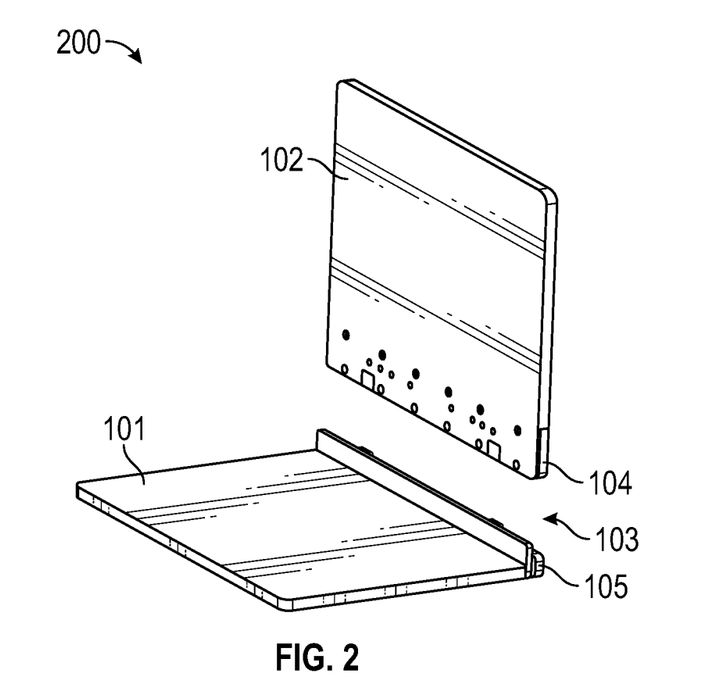

FIGS. 1 and 2 show docked and undocked states of an IHS comprising first IHS system 101 and second IHS system 102, according to some embodiments. Particularly, when the IHS is in docked configuration 100, first IHS system 101 is coupled to second IHS system 102 via docking interface 103. When the IHS is in undocked configuration 200, first and second IHS systems 101 and 102 are decoupled from one another, revealing female portion 104 and male portion 105 of docking interface 103 disconnected from each other.

In various implementations, first IHS system 101 and second IHS system 102 may each include one or more of IHS components. For example, first IHS system 101 may include a display, docking station, and/or user input device (e.g., keyboard, track pad, etc.), and second IHS system 102 may include a smartphone, tablet, or notebook. More generally, however, it should be noted that first IHS system 101 or second IHS system 102 may include any two mating, IHS devices or components.

In use, first IHS system 101 may be coupled to second IHS system 102 via docking interface 103 as the result of a successful blind-mating or docking operation. As used herein, the terms "docking" and "blind-mating" refer interchangeably to the coupling between two or more devices via a snapping action or the like, typically accomplished without wrenches or other tools.

Figure 3:
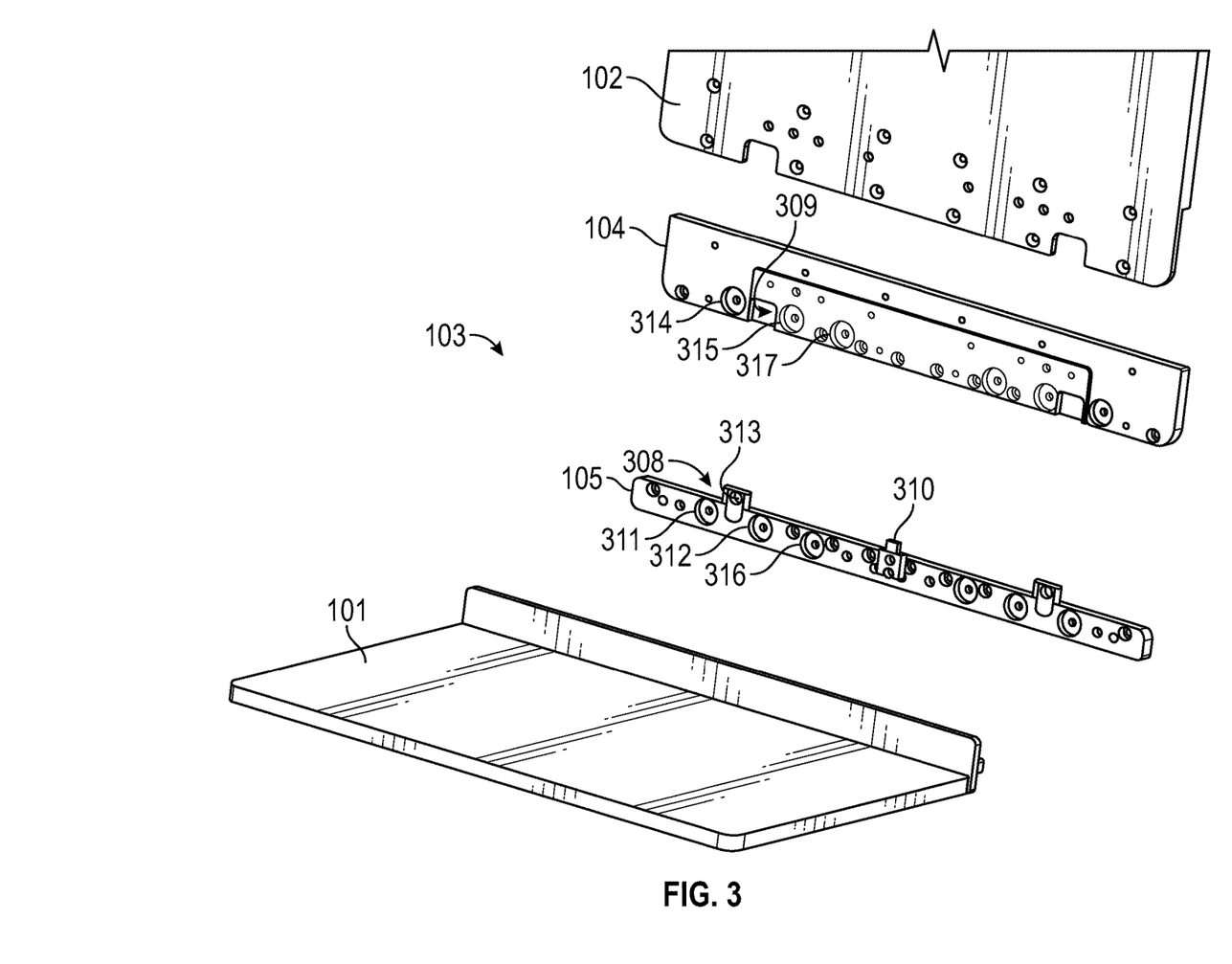
FIG. 3 is an exploded view of a non-limiting example of a docking interface according to some embodiments.
Figure 4:
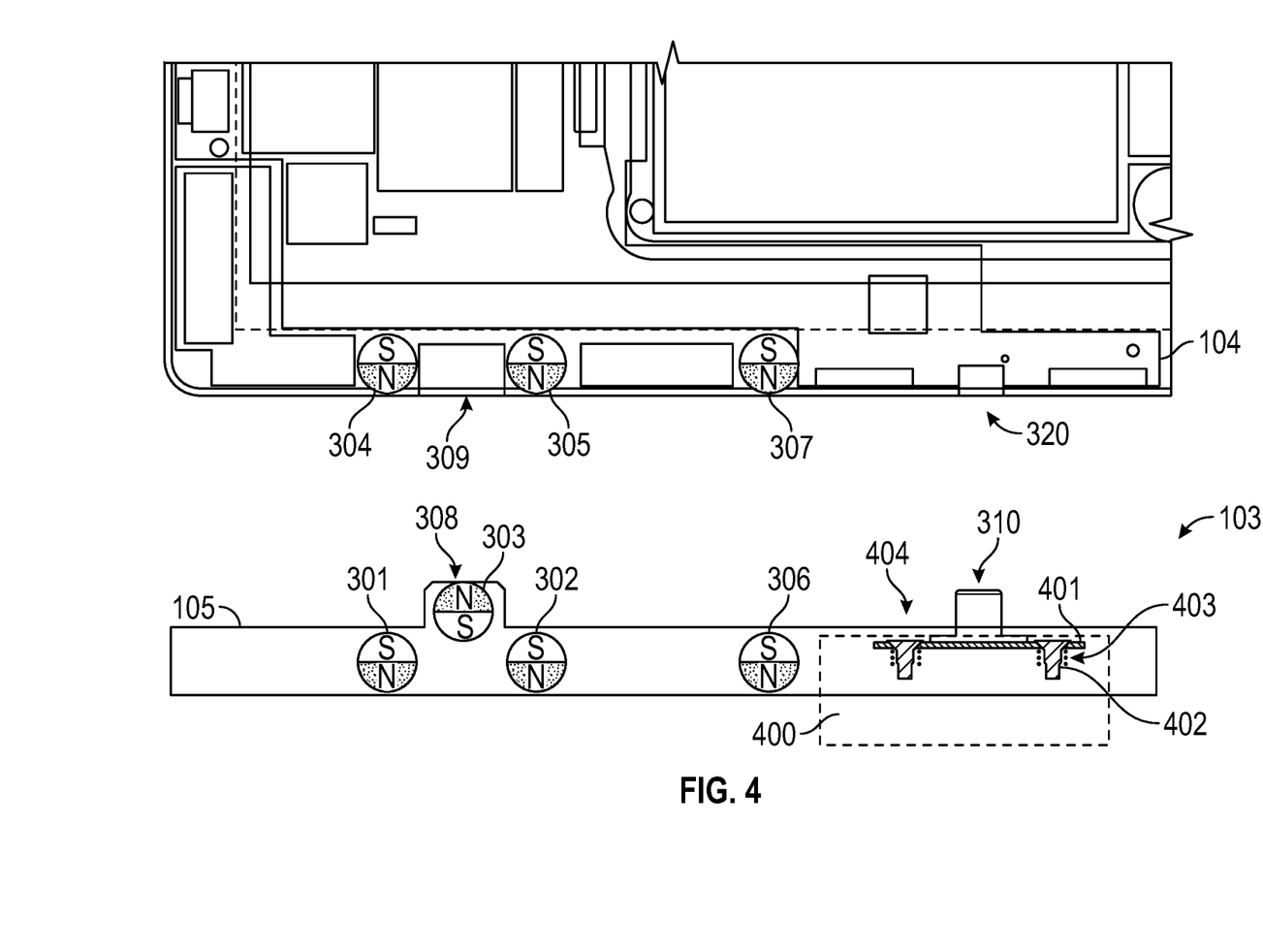
FIG. 4 is a diagram of a non-limiting example of a floating connector system according to some embodiments.

FIGS. 3 and 4 show elements of docking interface 103 according to some embodiments. As shown, first IHS system 101 includes male portion 105 and second IHS 102 includes female portion 104. Male portion 105 includes first pocket 311 configured to receive first magnetic device 301. Male portion 105 also includes second pocket 312 disposed across from first pocket 311 and configured to receive second magnetic device 302.

Guidepost 308 is disposed between first magnetic device 301 and second magnetic device 302, and it includes third pocket 313 configured to receive third magnetic device 303. Guidepost 308 may be taller than protruding connector 310 (e.g., 2.5 or 1.6 mm longer), and it may have a chamfer (e.g., 1 mm tall with a 20° slope) at its uppermost surface.

Female portion 104 includes fourth pocket 314 configured to receive fourth magnetic device 304 and fifth pocket 315 configured to receive fifth magnetic device 305. Gap or docking pocket 309 between fourth magnetic device 304 and fifth magnetic device 305 is configured to receive guidepost 308.

In addition, male portion 105 includes sixth pocket 316 configured to receive sixth magnetic device 306, and female portion 104 includes seventh pocket 317 configured to receive seventh magnetic device 307. In various embodiments, any of magnetic devices 301-307 may be a diametrically magnetized disk. Additionally or alternatively, any of magnetic devices 301-307 may be an electromagnetic coil.

In various implementations, magnetic devices 301, 302, and 304-307 may operate as clamping magnets, whereas magnetic device 303 may operate as an alignment magnet. First magnetic device 301, second magnetic device 302, fourth magnetic device 304, and fifth magnetic device 305 may have the same polarity orientation (south-north). Third magnetic device 303 may have a polarity orientation (north-south) opposite the other magnetic devices'.

When magnetic devices 301-307 have a circular shape, the diameter of first magnetic device 301, second magnetic device 302, fourth magnetic device 304, fifth magnetic device 305, sixth magnetic device 306, and seventh magnetic device 307 may be greater than the diameter of third magnetic device 303. In some cases, magnetic devices 301-307 may be implemented as neodymium magnets (e.g., grade "N48").

In an implementation example, an alignment magnet (e.g., third magnetic device 303) may be a diametrically magnetized disc magnet embedded inside a keyboard's (e.g., first IHS system 101) docking post (e.g., guidepost 308). The magnetic north pole field of the alignment magnet projects outward the top of the guidepost. Two docking pocket magnets (e.g., fourth magnetic device 304 and fifth magnetic device 305) are located on each side of a docking pocket (e.g., gap 309) of a tablet device (e.g., second IHS system 102).

Repulsion action (resulting from magnetic repulsion forces) between opposing magnetic fields created by the interaction between the alignment magnet and the two docking pocket magnets during a blind-mating operation automatically guides the docking system, coupling the docking post to the docking pocket. Auto-alignment is achieved and it is immediately followed by a clamping force mating first IHS system 101 to second IHS system 102—that is, magnetic devices 301-307 confer provide both an attachment force and auto-alignment properties.

Clamping action (resulting from magnetic attraction forces) between first magnetic device 301 and fourth magnetic device 304, and between second magnetic device 302 and fifth magnetic device 305, increase in response to third magnetic device 303 embedded in guidepost 308 approaching the center of gap or docking pocket 309. Meanwhile, repulsion action between third magnetic device 303 and fourth magnetic device 304, and between third magnetic device 303 and fifth magnetic device 305, decreases in response to third magnetic device 303 moving toward the center of gap or docking pocket 309. Interactions among the various magnetic fields provided by magnetic devices 301-307 during a blind-mating operation are shown in more detail in FIGS. 5-9.

It should be noted that, in various implementations, magnet size may be adjusted to meet various IHS form factors, geometries, electrical requirements, and/or weight considerations. In some cases, additional magnets may be used to keep magnetic field regions with a selected width and/or to provide a larger overall clamping force.

Protruding connector 310 (e.g., a high-pin count (HPC) connector) is supported by floating connector system 400. Floating connector system 400 includes fastener 402 (e.g., a counter-sink hole shoulder screw or the like) coupled to centering bracket 403, and compression spring 402. Floating connector system 400 may provide protruding connector 310 with a nominal spring-loaded plunger travel distance 404 (e.g., 0.85 mm).

Figure 10:
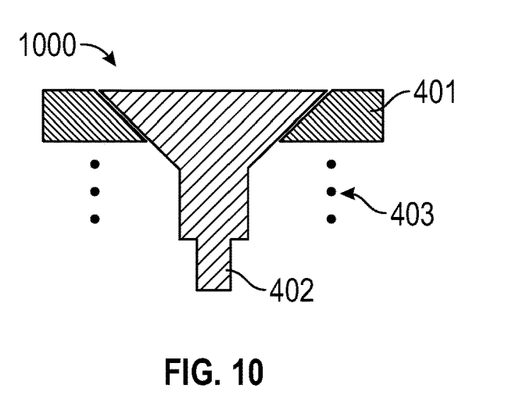
FIGS. 10-12 are diagrams of non-limiting examples of floating states of a connector interface during the docking or blind-mating operation according to some embodiments.
Figure 11:
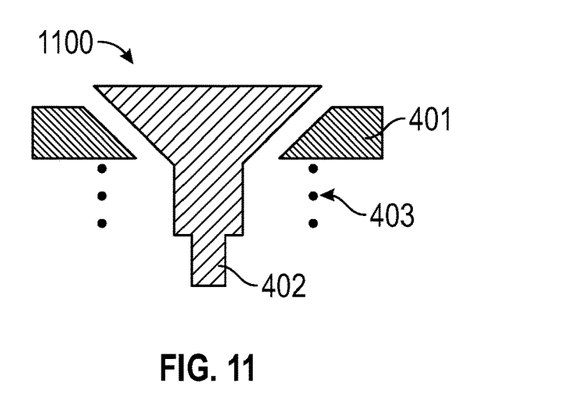
Figure 12:
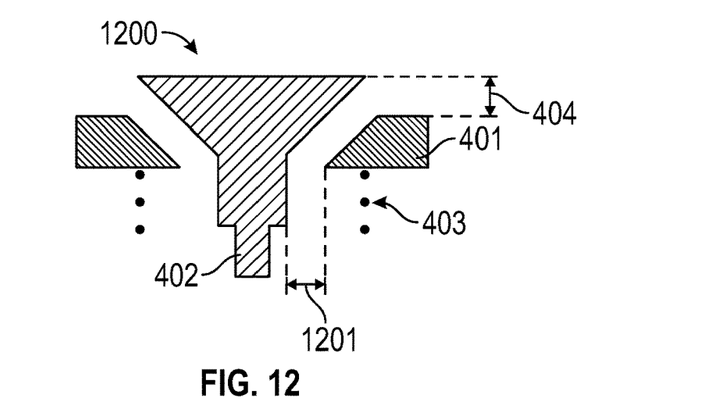

Floating states of interface 400 are illustrated in FIGS. 10-12. As the result of a successful blind-mating or docking operation, protruding connector 310 becomes coupled to receiving flared receptacle 320, as guidepost 308 also becomes coupled to docking pocket or gap 309.

FIGS. 5-9 depict different alignment states of docking interface 103 during a docking or blind-mating operation. In various embodiments, states 500-900 may be followed in sequence, such that state 500 shows docking interface 103 decoupled and in misalignment, states 600-800 show examples of intermediate states reached during the mating operation, as first IHS system 101 and second IHS system 102 move and auto-align with respect to one another, and state 900 shows the mated docking interface.

As shown in FIGS. 5-9 the overall magnetic action at the beginning of the blind-mate docking process results in dominant x-direction auto-alignment forces. Magnetic repulsion action ensures adequate spacing between docking features as docking interface 103 assumes states 600 and 700 of FIGS. 6 and 7, until perfect alignment is achieved in state 800 of FIG. 8.

Figure 5:
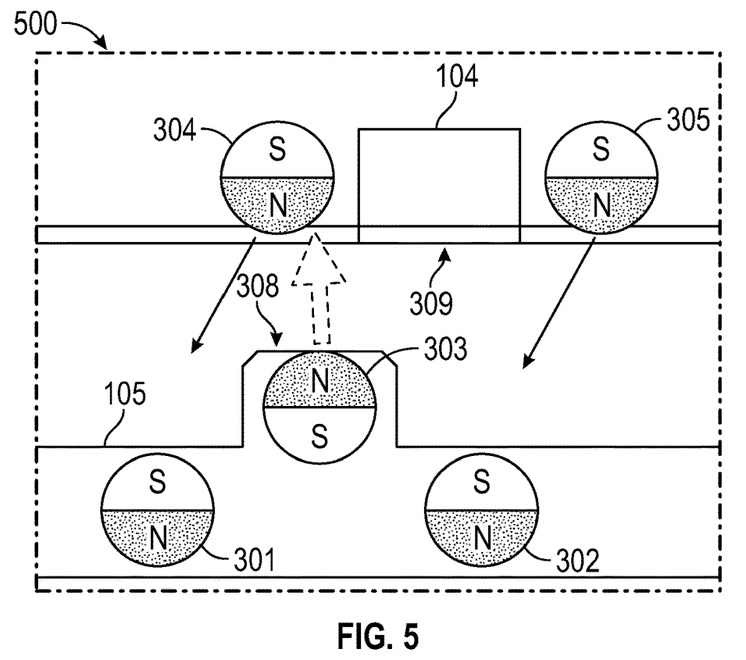
FIGS. 5-9 are diagrams of non-limiting examples of different alignment states of the docking interface during a docking or blind-mating operation according to some embodiments.

FIG. 5 shows state 500 where male portion 105 and female portion 104 of docking interface 103 are misaligned, as they first approach each other. In state 500, strong repulsion vectors keep IHS system 101 and IHS system 102 from becoming coupled to each other in misalignment, which can otherwise result in damage to protruding connector 310. Docking interface 103 assumes states 600 and 700 of FIGS. 6 and 7, until perfect alignment is achieved in state 800 of FIG. 8.

Figure 9:
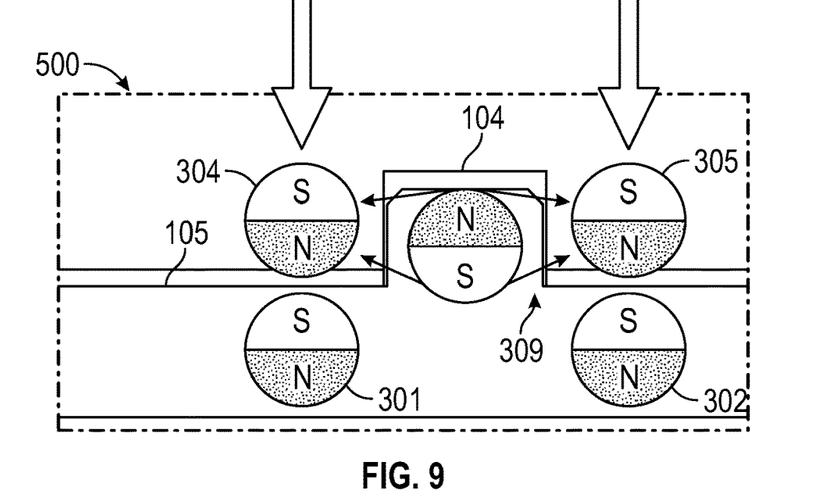

In FIG. 9, state 900 shows that the repulsion action is dissipated and the clamping magnets provide mated attachment between IHS systems 101 and 102. State 900 provides docking retention, which reduces or eliminates the need to additional latching subsystems. The overall magnetic action shown in states 500-900 gradually transitions from high auto-alignment to high clamping forces, as the docking position becomes more aligned.

In state 500, the magnitude of the repulsion action between third magnetic device 303 and fourth magnetic device 304, and the magnitude of the repulsion action between third magnetic device 303 and fifth magnetic device 305, are much greater than the magnitude of the clamping action between first magnetic device 301 and fourth magnetic device 304, and of the clamping action between second magnetic device 302 and fifth magnetic device 305.

Figure 6:
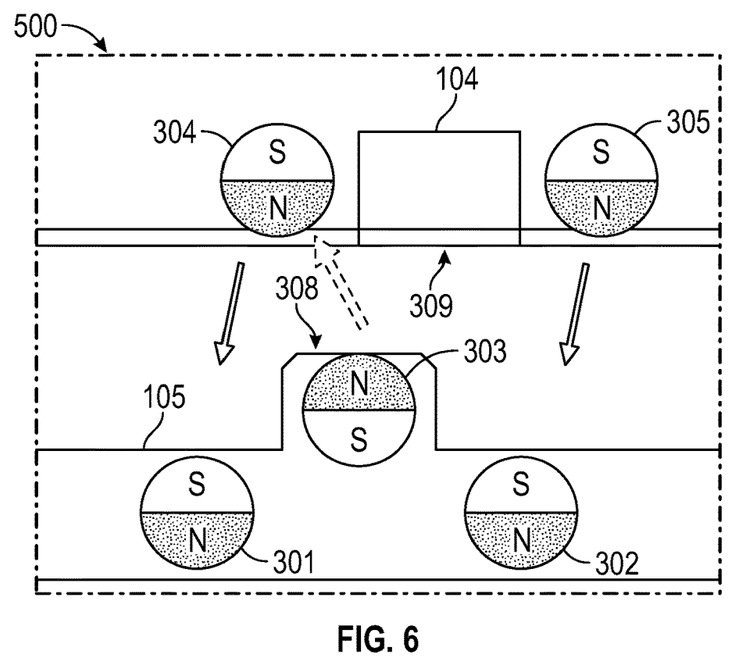

In state 600, the magnitude of the repulsion action between third magnetic device 303 and fourth magnetic device 304, and the magnitude of the repulsion action between third magnetic device 303 and fifth magnetic device 305, approach the magnitude of the clamping action between first magnetic device 301 and fourth magnetic device 304, and of the clamping action between second magnetic device 302 and fifth magnetic device 305.

Figure 7:
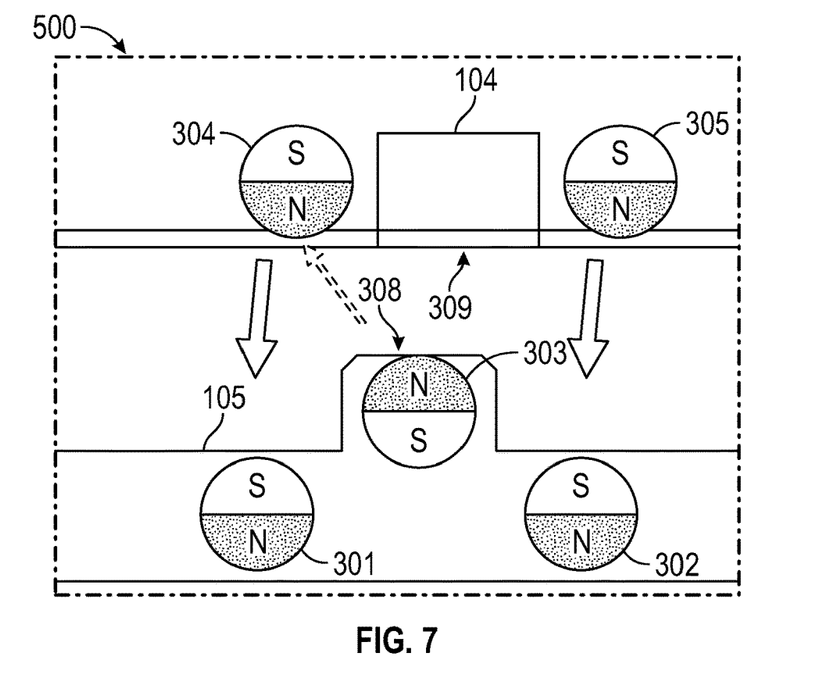

In state 700, the magnitude of the repulsion action between third magnetic device 303 and fourth magnetic device 304, and the magnitude of the repulsion action between third magnetic device 303 and fifth magnetic device 305, drop below the magnitude of the clamping action between first magnetic device 301 and fourth magnetic device 304, and of the clamping action between second magnetic device 302 and fifth magnetic device 305.

Figure 8:
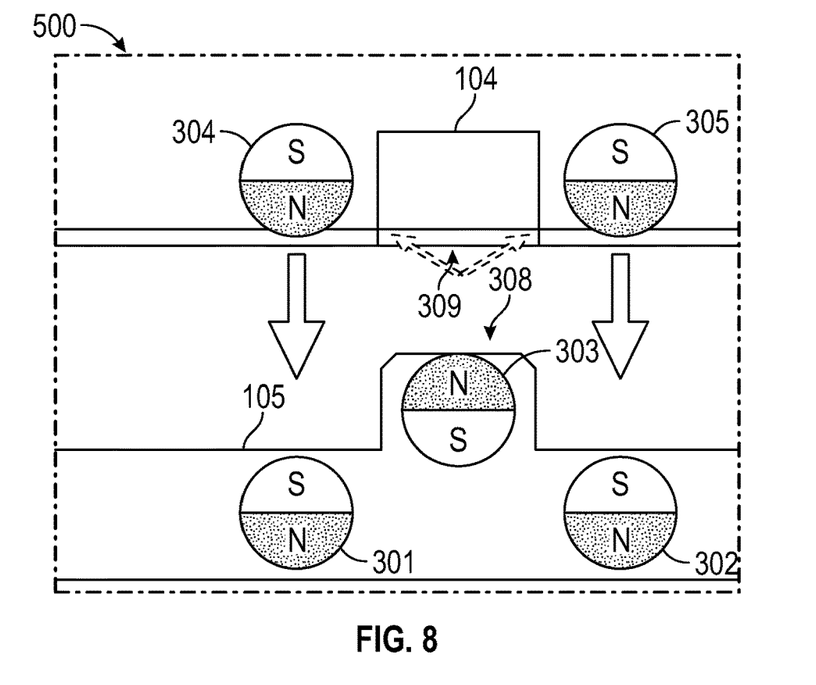

In state 800, the magnitude of the repulsion action between third magnetic device 303 and fourth magnetic device 304, and the magnitude of the repulsion action between third magnetic device 303 and fifth magnetic device 305, are now much weaker than the magnitude of the clamping action between first magnetic device 301 and fourth magnetic device 304, and of the clamping action between second magnetic device 302 and fifth magnetic device 305.

In state 900, the repulsion action is dissipated and the clamping action between first magnetic device 301 and fourth magnetic device 304, and between second magnetic device 302 and fifth magnetic device 305, dominate. Moreover, docked or mated position 100 creates an additional attractive force between opposite poles of third magnetic device 303 and fourth magnetic device 304, and between opposite poles of third magnetic device 303 and fifth magnetic device 305.

FIGS. 10-12 show states of floating connector system 400 during a docking or blind-mating operation, according to some embodiments. As described herein, docking interface 103 is magnetically and/or mechanically aligned using one or more guideposts 308. Floating connector system 400 may also be employed to meet the part and assembly tolerances and/or to provide self-centering properties to protruding connector 310. In some implementations, floating connector system 400 may plunge down to a selected manufacturing tolerance specification (e.g., 0.85 mm) to auto-align protruding connector 310 with flared receptacle 320.

As shown, floating states 1000-1200 are reached by floating connector system 400 in sequence, as centering bracket 401 plunges by vertical distance 404, such that clearance 1201 is created and/or increased, and enables X-Y movement ("side-to-side" and "front-to-back") of protruding connector 310 to follow the chamfer as it docks into flared receptacle 320. Although not shown for sake of simplicity, it should be noted that floating connector system 400 may also include foam material to facilitate X-Y movement.

Figure 13:
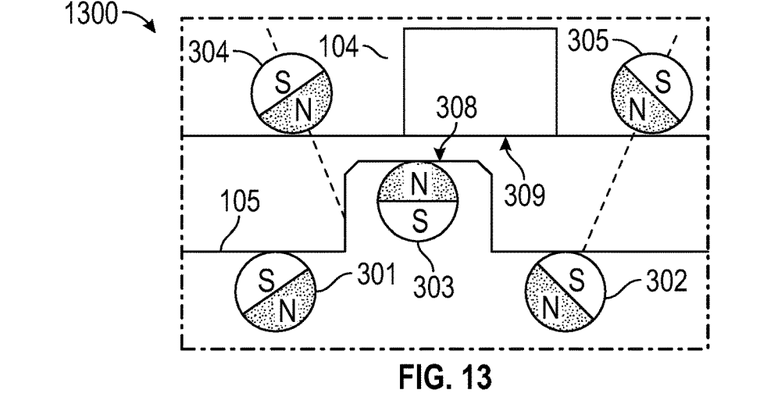
FIGS. 13 and 14 are diagrams of a non-limiting example of the docking interface with clocked magnetic devices according to some embodiments.
Figure 14:
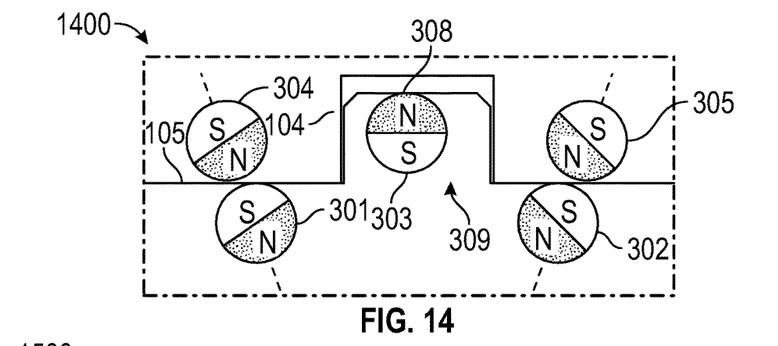

FIGS. 13 and 14 show docking interface 103 with clocked magnetic devices. In some embodiments, clocked magnetic devices (in this case first magnetic device 301, second magnetic device 302, fourth magnetic device 304, and fifth magnetic device 305) may be configured to re-direct magnetic fields as shown in FIGS. 5-9.

Orientation of magnetic devices inward or outward by an acute angle, such that the polarization direction of third magnetic device 303 is not parallel with the polarization direction of the other magnetic devices, for example, may selectively expand or reduce force fields in the alignment region to tune the desired "snap to center" user experience. Additional magnetic devices may be added in male portion 105 to regain strength of auto-alignment properties if clocking results in overly strong clamping action. In these cases, the magnetic devices may be clocked specifically to bias most of the action or forces toward the center of docking pocket or gap 309, as some magnetic action on the outward regions drops off.

In various embodiments, one or more of magnetic devices 301-307 may be implemented using electromagnetic coils. The use of electromagnetic coils instead of fixed magnets may enable control of magnetic field(s) dynamically and in real-time during docking and/or undocking operations, which promotes controlled magnetic performance in difficult docking scenarios, and allows greater or smaller clamping action depending on user requirements or other factors.

Figure 15:
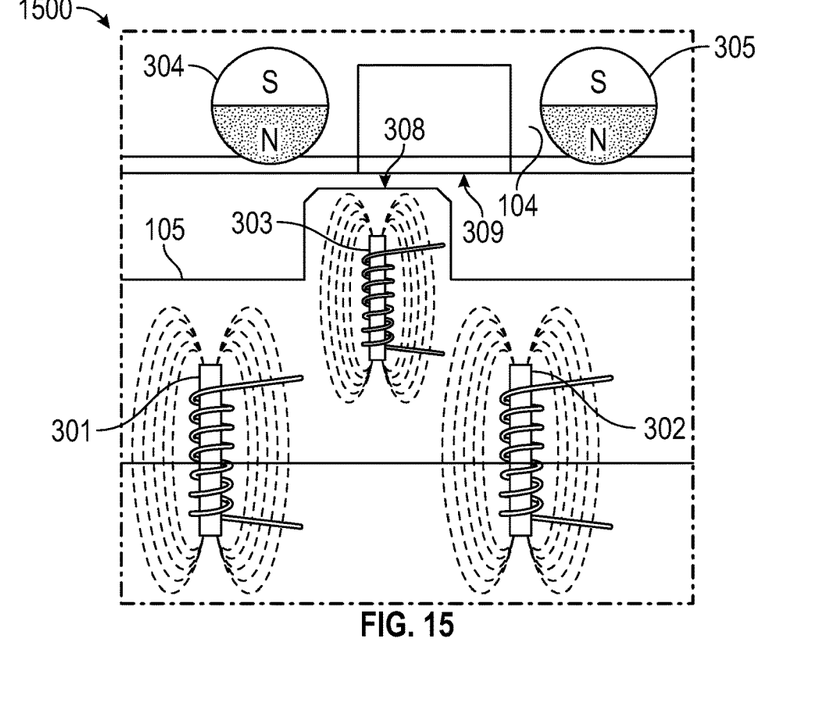
FIG. 15 is a diagram of a non-limiting example of the docking interface with electromagnetic coils according to some embodiments.

FIG. 15 shows docking interface 103, in this case, with electromagnetic coils implementing magnetic devices 301-303. In some embodiments, control and operation of electromagnetic coils 301-303 may be performed by IHS 600 of FIG. 6 executing mating control application 1700 of FIG. 17.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, science, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

Figure 16:
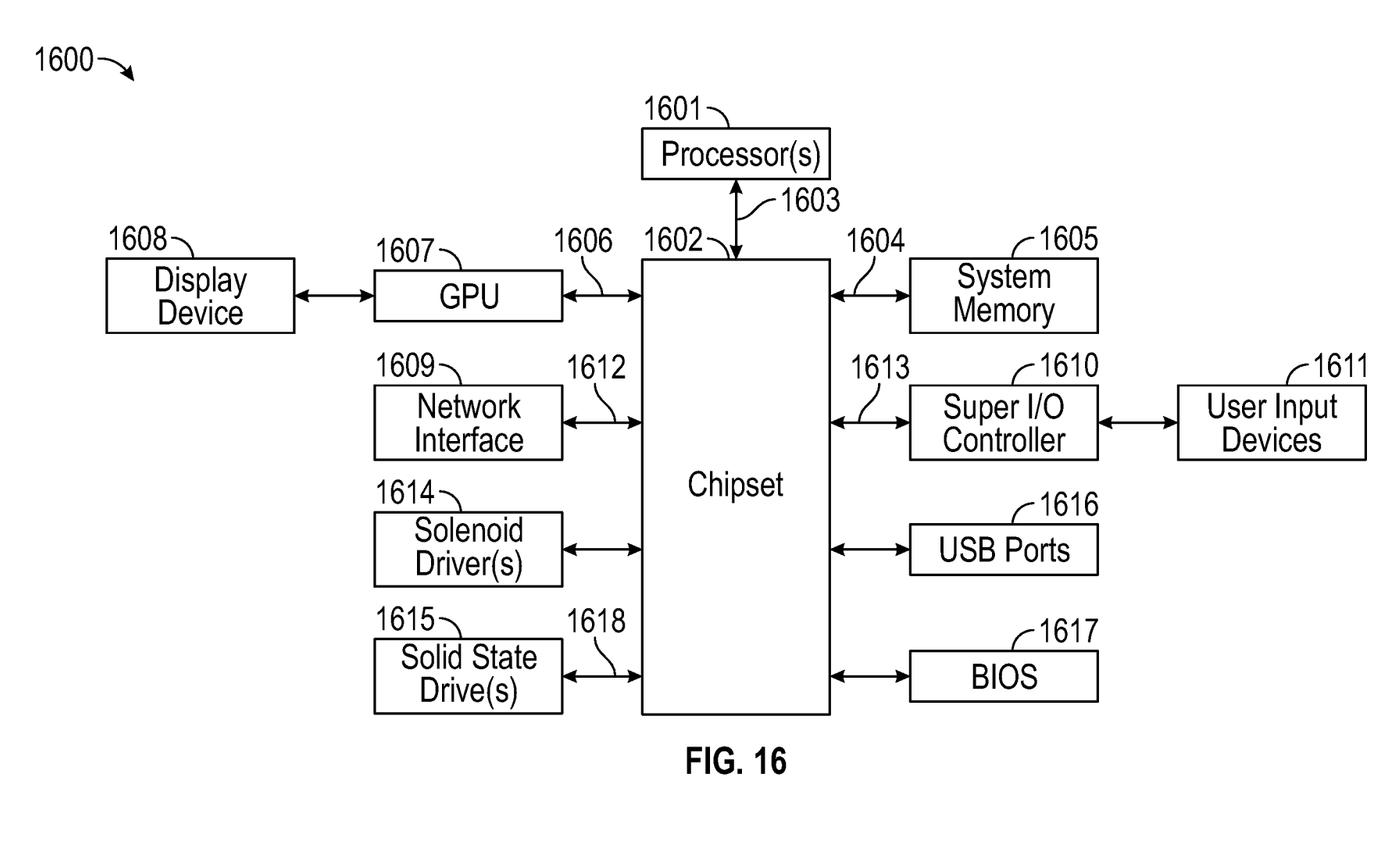
FIG. 16 is a block diagram of non-limiting examples of information handling system components according to some embodiments.

FIG. 16 illustrates IHS 1600 configured to control electromagnetic coils 301-303 shown in FIG. 15. First IHS system 101 and/or second IHS system 102 may be implemented IHS 1600 or component(s) thereof.

As shown, IHS 1600 includes one or more processors 1601. In various embodiments, IHS 1600 may be a single-processor system including one processor 1601, or a multi-processor system including two or more processors 1601. Processor(s) 1601 may include any processor capable of executing program instructions, such as any general-purpose or embedded processor implementing any of a variety of Instruction Set Architectures (ISAs).

IHS 1600 comprises chipset 1602 that may include one or more integrated circuits that are connected to processor(s) 1601. In certain embodiments, chipset 1602 may utilize QPI (QuickPath Interconnect) bus 1603 for communicating with the processor(s) 1601. Chipset 1602 provides processor(s) 1601 with access to a variety of resources. For instance, chipset 1602 provides access to system memory 1605 over memory bus 1604. System memory 1605 may be configured to store program instructions and/or data accessible by processors(s) 1601. In various embodiments, system memory 1605 may be implemented using any suitable memory technology, such as static RAM (SRAM), dynamic RAM (DRAM) or nonvolatile/Flash-type memory.

Chipset 1602 may also provide access to Graphics Processing Unit (GPU) 1607. In certain embodiments, graphics processor 1607 may part of one or more video or graphics cards that have been installed as components of IHS 1600. Graphics processor 1607 may be coupled to the chipset 1602 via graphics bus 1606 such as provided by an AGP (Accelerated Graphics Port) bus or a PCIe (Peripheral Component Interconnect Express) bus. In certain embodiments, GPU 1607 generates display signals and provides them to display device 1608.

In certain embodiments, chipset 1602 may also provide access to one or more user input devices 1611. In such embodiments, chipset 1602 may be coupled to a super I/O controller 1610 that provides interfaces for a variety of user input devices 1611, in particular lower bandwidth and low data rate devices.

For instance, super I/O controller 1610 may provide access to a keyboard and mouse or other peripheral input devices. In certain embodiments, super I/O controller 1610 may be used to interface with coupled user input devices 1611 such as keypads, biometric scanning devices, and voice or optical recognition devices. These I/O devices may interface with super I/O controller 1610 through wired or wireless connections. In certain embodiments, chipset 1602 may be coupled to super I/O controller 1610 via Low Pin Count (LPC) bus 1613.

Other resources may also be coupled to processor(s) 1601 of IHS 1600 through chipset 1602. In certain embodiments, chipset 1602 may be coupled to a network interface 1609, such as provided by a Network Interface Controller (NIC) that is coupled to IHS 1600. In certain embodiments, network interface 1609 may be coupled to chipset 1602 via PCIe bus 1612. According to various embodiments, network interface 1609 may also support communication over various wired and/or wireless networks and protocols (e.g., Wi-Fi, Bluetooth, etc.). In certain embodiments, chipset 1602 may also provide access to one or more Universal Serial Bus (USB) ports 1616.

Chipset 1602 also provides access to one or more solid state storage devices 1615 using PCIe bus interface connection 1618. In certain embodiments, chipset 1602 may also provide access to other types of storage devices. For instance, in addition to solid state storage device 1615, IHS 1600 may also utilize one or more magnetic disk storage devices, or other types of the storage devices such as an optical drive or a removable-media drive. In various embodiments, solid state storage device 1615 may be integral to IHS 1600, or may be located remotely from IHS 1600.

Upon powering or restarting IHS 1600, processor(s) 1601 may utilize instructions stored in Basic Input/Output System (BIOS) or Unified Extensible Firmware Interface (UEFI) chip 1617 to initialize and test hardware components coupled to IHS 1600 and to load an Operating System (OS) for use by IHS 1600. Generally, BIOS 1617 provides an abstraction layer that allows the OS to interface with certain hardware components that utilized by IHS 1600. It is through this hardware abstraction layer that software executed by the processor(s) 1601 of IHS 1600 is able to interface with I/O devices that coupled to IHS 1600.

Figure 17:
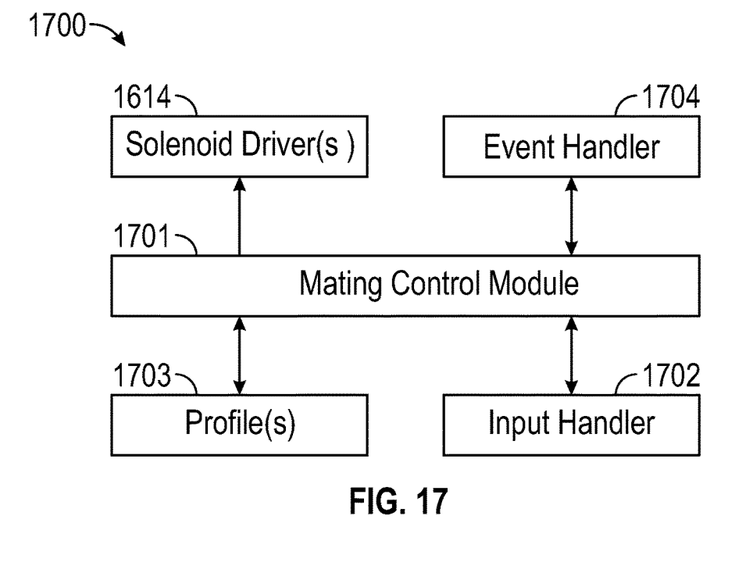
FIG. 17 is a block diagram of a non-limiting example of a mating control application according to some embodiments.

In some cases, IHS 1600 may also interface with solenoid driver circuit 1614 configured to controllably drive electromagnetic coils 301-303 of FIG. 15. In various implementations, solenoid driver circuit 1614 may include control circuitry, rectifiers, digital-to-analog circuitry, regulating circuitry, and/or amplifying circuitry necessary to apply selected amounts of electrical current to the electromagnetic coils at any given time, therefore altering the strength of the magnetic fields produced by those coils, independently of each other and/or an individual basis, during a docking or undocking operation, under control of mating application 1700 executed by IHS 1600.

In various embodiments, IHS 1600 may not include each of the components shown in FIG. 16. Additionally or alternatively, IHS 1600 may include various components in addition to those that are shown. Furthermore, some components that are represented as separately may, in other embodiments, be integrated with other components. For example, in various implementations, all or a portion of the functionality provided by the illustrated components may instead be provided by components integrated into the one or more processor(s) 1601 as a system-on-a-chip (SOC) or the like.

FIG. 17 shows mating control application 1700. In some embodiments, mating control module 1701 may be coupled to solenoid drivers 1614, input handler 1702, profile(s) 1703, and event handler 1704. Mating control module 1701 may be configured to turn individual coils on or off through drivers 414 in connection with, or during, a docking or undocking procedure in a predetermined manner as selected by a user via input handler 1702. For example, a user may configure mating control module 1701, through input handler 1702, such that the docking operation is performed with the coils turned on, and the undocking operation is performed with the coils turned off.

Additionally or alternatively, mating control module 1701 may be configured to apply varying degrees of electrical current to individual coils through drivers 1614 following profile(s) 1703. For example, the auto-alignment process shown in FIGS. 5-9 may be facilitated by increasing and decreasing the strengths of the individual magnetic fields provided by coils 301-303 in real time to further promote the alignment of docking features.

Additionally or alternatively, mating control module 1701 may be configured to control the electrical current applied to coils 301-303 in response to certain events detected by event handler 1704. Examples of events include those detected by onboard sensors in first IHS system 101 or second IHS system 102, such as presence sensors or accelerometers, that provide real-time information as to the state (e.g., docked or undocked), position, speed, and/or acceleration of first IHS system 101 with respect to second IHS system 102. Other events may be software-triggered, such as scheduled calendar meetings or predicted docking and undocking states that may be monitored and/or evaluated via mating application 1700 based upon a user's past or expected behavior.

For example, if mating application 1700 detects a shut-down command via event handler 1704, it may control solenoid drivers 1614 to turn off one or more clamping coils (or to decrease its electrical current by a predetermined amount) to facilitate an expected undocking operation. Conversely, if mating application 1700 detects a wake-up command via event handler 1704, it may increase the current applied to one or more clamping coils to increase the clamping action in docking interface 103.

In some cases, machine learning techniques may be applied by mating application 1700 to associate particular user or software behaviors with different docking interface states. For instance, if IHS 100 is executing a word processing application, mating application 1700 may reduce the current applied to one or more clamping coils to save electrical power because the user is unlike to physically move or displace the system while operating such an application. On the other hand, if the user is executing a camera application, mating application 1700 may increase the amount of electrical current applied to one or more clamping coils to prevent first IHS system 101 and second IHS system 102 to come apart, because the user is more likely to pick up IHS 100 in order to shoot or still or moving picture.

Additionally or alternatively, electromagnetic coils 301-303 in first IHS system 101 may be controlled by second IHS system 102 through a wireless communication channel between those systems. An example of such a channel includes, but is not limited to, a Bluetooth Low Energy (BLE) channel.

It should be understood that various operations described herein may be implemented in software or software modules executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements that such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
receiving a first component of an Information Handling System (IHS), wherein the first component comprises a male portion, and wherein the male portion comprises:
a first magnetic device;
a second magnetic device disposed across from the first magnetic device; and
a first guidepost disposed between the first magnetic device and the second magnetic device, wherein the first guidepost comprises a third magnetic device;
receiving a second component of the IHS, wherein the second component comprises a female portion, and wherein the female portion comprises:
a fourth magnetic device; and
a fifth magnetic device disposed across from the fourth magnetic device with a first gap between the fourth magnetic device and the fifth magnetic device, wherein the first gap is configured to receive the first guidepost, and wherein one or more of the first, second, third, fourth, or fifth magnetic devices comprises an electromagnetic coil;
coupling the first component to the second component by inserting the first guidepost into the first gap; and
configuring a magnetic field created by the electromagnetic coil.

2. The method of claim 1, wherein the first, second, fourth, and fifth magnetic devices have a given polarity orientation, and wherein the third magnetic device has another polarity orientation opposite the given polarity orientation.

3. The method of claim 1, wherein a clamping action between the first and fourth magnetic devices and between the second and fifth magnetic devices increases in response to the third magnetic device approaching a center of the first gap during the coupling.

4. The method of claim 3, wherein a repulsion action between the third magnetic device and the fourth magnetic device and between the third magnetic device and the fifth magnetic device increases in response to the third magnetic device moving away from the center of the first gap during the coupling.

5. The method of claim 1, wherein the first, second, third, fourth, and fifth magnetic devices have a circular shape.

6. The method of claim 5, wherein the first, second, fourth, and fifth magnetic devices are clocked with respect to the third magnetic device.

7. The method of claim 5, wherein a diameter of the first, second, fourth, and fifth magnetic devices is greater than a diameter of the third magnetic device.

8. The method of claim 1, wherein the male portion further comprises:
another first magnetic device;
another second magnetic device disposed across from the other first magnetic device; and
a second guidepost disposed between the other first magnetic device and the other second magnetic device, wherein the second guidepost comprises another third magnetic device;
wherein the female portion further comprises:
another fourth magnetic device; and
another fifth magnetic device disposed across from the other fourth magnetic device with a second gap between the other fourth magnetic devices and the fifth magnetic device, wherein the second gap is configured to receive the second guidepost; and
and wherein the method further comprises inserting the second guidepost into the second gap.

9. The method of claim 8, wherein the first or second components further comprises a data connector disposed between the first guidepost and the second guidepost.

10. The method of claim 9, wherein the data connector has a length shorter than a length of the first or second guideposts.

11. The method of claim 9, wherein the data connector is supported by a floating connector system.

12. The method of claim 1, wherein the magnetic field is configurable dynamically by the IHS.

13. The method of claim 1, wherein the magnetic field is configurable in response to a signal generated by a sensor coupled to the IHS.

14. The method of claim 1, wherein the magnetic field is manually configurable by an end-user of the IHS.

15. The method of claim 1, wherein the magnetic field is configurable in response to an event generated by program instructions executed by the IHS.

16. The method of claim 1, wherein the magnetic field is configurable in response to a signal generated by a sensor coupled to the IHS.

17. A hardware memory storage device having program instructions stored thereon that, upon execution by a processor of an Information Handling System (IHS), cause the IHS to:
receive an instruction to change a magnetic field produced by an electromagnetic coil disposed within a docking interface, the docking interface comprising:
a male portion, comprising:
a first magnetic device;
a second magnetic device disposed across from the first magnetic device; and
a guidepost disposed between the first magnetic device and the second magnetic device, wherein the guidepost comprises a third magnetic device; and
a female portion, comprising:
a fourth magnetic device; and
a fifth magnetic device disposed across from the fourth magnetic device with a gap between the fourth magnetic device and the fifth magnetic device, wherein the gap is configured to receive the guidepost, and wherein the at least one of the first, second, third, fourth, or fifth magnetic devices comprises the electromagnetic coil; and configure the magnetic field in response to the instruction, wherein the change causes the male portion to align with the female portion during a mating operation.

18. The hardware memory storage device of claim 17, wherein: (a) the instruction is issued by an end-user of the IHS; (b) the instruction is issued in response to an event generated by a software application executed by the IHS; or (c) the instruction is issued in response to an event detected by a sensor coupled to the IHS.

\* \* \* \* \*